(12) United States Patent
Stewart

(10) Patent No.: US 11,686,337 B2
(45) Date of Patent: Jun. 27, 2023

(54) FACETED LOBULAR THREADS

(71) Applicant: Robert E. Stewart, Farmington Hills, MI (US)

(72) Inventor: Robert E. Stewart, Farmington Hills, MI (US)

(*) Notice: Subject to any disclaimer, the term of this patent is extended or adjusted under 35 U.S.C. 154(b) by 764 days.

(21) Appl. No.: 16/716,637

(22) Filed: Dec. 17, 2019

(65) Prior Publication Data

US 2020/0208670 A1 Jul. 2, 2020

Related U.S. Application Data

(60) Provisional application No. 62/786,998, filed on Dec. 31, 2018.

(51) Int. Cl.
*F16B 35/04* (2006.01)
*F16B 25/00* (2006.01)
*F16B 33/00* (2006.01)

(52) U.S. Cl.
CPC ...... *F16B 25/0047* (2013.01); *F16B 25/0021* (2013.01); *B23B 2231/0204* (2013.01); *B23B 2251/02* (2013.01); *F16B 25/0057* (2013.01); *F16B 25/0073* (2013.01); *F16B 25/0084* (2013.01); *F16B 33/008* (2013.01)

(58) Field of Classification Search
CPC .............. F16B 25/0047; F16B 25/0021; F16B 25/0057; F16B 25/0073; F16B 25/0084; F16B 33/008; F16B 25/0052; F16B 23/00; F16B 23/0007; B23B 2231/0204; B23B 2251/02

USPC ........................ 411/387.8, 395, 416, 82, 258
See application file for complete search history.

(56) References Cited

U.S. PATENT DOCUMENTS

| | | | | |
|---|---|---|---|---|
| 3,195,156 A | * | 7/1965 | Phipard, Jr. | F16B 25/0047 411/416 |
| 3,249,142 A | | 5/1966 | Phipard, Jr. | |
| 3,405,591 A | * | 10/1968 | Neuschotz | F16B 37/122 411/416 |
| 3,472,119 A | * | 10/1969 | Peterson, Jr. | F16B 25/0047 470/9 |
| 3,530,760 A | * | 9/1970 | Lindstrand | F16B 25/0047 411/416 |
| 3,802,015 A | | 4/1974 | Chase et al. | |
| 3,877,339 A | | 4/1975 | Muenchinger | |
| 3,918,345 A | | 11/1975 | Phipard, Jr. | |
| 3,978,760 A | | 9/1976 | Muenchinger | |
| 4,040,328 A | | 8/1977 | Muenchinger | |

(Continued)

OTHER PUBLICATIONS

Reminc and Conti Fasteners AG, Taptite 2000 Fasteners, 3 pages.
Fredsert Threaded Inserts, 7 pages.

*Primary Examiner* — Gary W Estremsky
(74) *Attorney, Agent, or Firm* — Reising Ethington, P.C.

(57) ABSTRACT

A faceted lobular threaded component and methods for making and/or installing the same. A faceted lobular threaded component may include a head, and a shank extending along a longitudinal axis away from the head. The component may also include an external faceted lobular thread in the shank extending around the longitudinal axis. The external faceted lobular thread may include at least four facets per thread revolution, and at least four lobes per thread revolution circumferentially interspersed between the at least four facets and established by the at least four facets.

24 Claims, 6 Drawing Sheets

(56) References Cited

U.S. PATENT DOCUMENTS

| | | | | |
|---|---|---|---|---|
| 4,657,460 A * | 4/1987 | Bien | ............... | F16B 39/225 |
| | | | | 411/258 |
| 4,820,098 A | 4/1989 | Taubert et al. | | |
| 5,674,036 A * | 10/1997 | Hsieh | ............... | F16B 23/0092 |
| | | | | 411/410 |
| 6,254,327 B1 * | 7/2001 | Chen | ............... | F16B 25/0052 |
| | | | | 411/387.4 |
| 6,375,401 B1 * | 4/2002 | McNeill | ............... | F16B 35/04 |
| | | | | 411/416 |
| 6,431,869 B1 | 8/2002 | Reams, III et al. | | |
| 6,712,708 B2 | 3/2004 | Boyer et al. | | |
| 8,556,558 B1 * | 10/2013 | Hunt | ............... | F16B 39/021 |
| | | | | 411/395 |
| 8,685,070 B2 * | 4/2014 | Rupp | ............... | B23G 9/001 |
| | | | | 606/309 |
| 8,858,346 B2 | 10/2014 | Willert et al. | | |
| 9,404,524 B2 | 8/2016 | Pritchard | | |
| 9,738,792 B2 | 8/2017 | Stupar et al. | | |
| 2005/0058521 A1 * | 3/2005 | Stevenson | ............... | F16B 13/143 |
| | | | | 411/82 |
| 2006/0039775 A1 * | 2/2006 | Mizuno | ............... | F16B 25/0021 |
| | | | | 411/387.4 |
| 2007/0280803 A1 | 12/2007 | Pritchard | | |
| 2013/0330145 A1 * | 12/2013 | Cloud | ............... | F16B 25/106 |
| | | | | 411/368 |

\* cited by examiner

FACETED LOBULAR THREADS

CROSS-REFERENCE TO RELATED APPLICATIONS

This application claims priority to U.S. Provisional Patent Application Ser. No. 62/786,998, filed on Dec. 31, 2018, the contents of which are hereby expressly incorporated by reference in their entirety.

TECHNICAL FIELD

This disclosure relates generally to threaded components and, more particularly, to lobular thread forms.

BACKGROUND

Internally threaded inserts or mounts are commonly found on armored vehicles to provide attachment points for armored panels, armaments, and various accessories. Some versions of threaded mounts include an internally threaded mounting boss welded to a panel or a frame underlying the panel. Other versions include internally and externally threaded mounts adapted to be threaded into a blind hole that is at least partially thread-tapped. Such mounts typically include a head having drive apertures or a hexagonal exterior profile, a cylindrical shank extending away from the head along a longitudinal axis, an internally threaded through bore extending through the head and the shank, and an external thread form rolled into the shank. The thread form is interrupted with flutes milled at a taper angle along the longitudinal axis to form cutting faces in the thread form that are used to cut internal threads into a panel in which the mount is inserted.

Armored vehicles are being designed to be lighter without sacrificing strength through increased use of structures composed of softer materials like aluminum, magnesium, and even some mild steels. Also, armored vehicles operate in severe-duty environments, wherein threaded mounts must survive significant destructive forces to maintain integrity of the vehicle structure.

But traditional threaded mount designs do not survive the extreme vibration, severe shock, and thermal cycling of severe-duty environments, and are not able to withstand required clamp loads of grade 8 fasteners, such that prior threaded mount designs are easily stripped out due to low pullout resistance. In addition, the interface of steel fasteners to non-ferrous structures can become significantly compromised due to galvanic corrosion therebetween. Threaded mount failure can lead to unplanned field service repairs or even loss of the armored vehicle.

DETAILED DESCRIPTION

Figure 1:
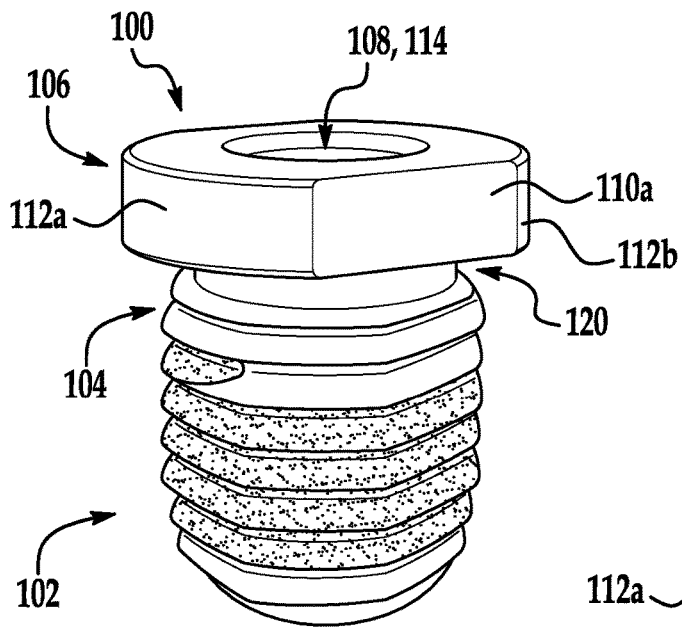
FIG. 1 illustrates a perspective view of a large faceted lobular threaded component in accordance with an illustrative embodiment of the present disclosure.
Figure 2:
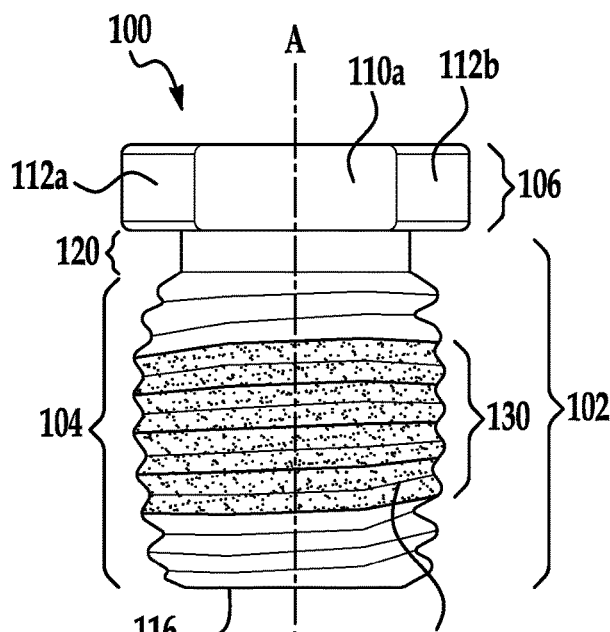
FIGS. 2-5 illustrate side views of the faceted lobular threaded component of FIG. 1, taken from four different perspectives about the threaded component, respectively.

In general, a method and a product will be described using one or more examples of illustrative embodiments of a faceted lobular threaded component. The example embodiment(s) will be described with reference to the component's use as an internally threaded mount in an armored vehicle environment. However, it will be appreciated as the description proceeds that the invention is useful in many different applications and may be implemented in many other embodiments.

Example faceted lobular components may be produced from blanks, as will be discussed further below. Example blanks may have heads, and shanks extending from the head and including cylindrical portions to carry threads and cylindrical channels between the shanks and the heads.

In other embodiments, the shanks may be faceted to include a desired quantity of facets. The facets may be equal in size and extent and may be circumferentially equidistantly arranged about longitudinal axes of the blanks. In these embodiments, the facets may be forged, milled, or produced in any other suitable manner.

Turning now to FIGS. 1-10, an illustrative embodiment of a threaded component 100 including a novel external faceted lobular thread is shown. The component 100 may be a threaded bolt, stud, mount, or any other type of component suitable to carry an external thread. The component 100 includes a shank 102 extending along a longitudinal axis A-A, and an external faceted lobular thread 104 in the shank 102 extending around the longitudinal axis A-A.

The component may include a head 106 from which the shank 102 may extend. The head may have an internally threaded head passage 108, and external flats. More specifically, the head 106 may include two flat opposite sides 110*a* and 110*b* (collectively, 110), and two semi-cylindrical opposite sides 112*a* and 112*b* (collectively, 112) circumferentially interspersed between the two flat opposite sides 110.

Figure 8:
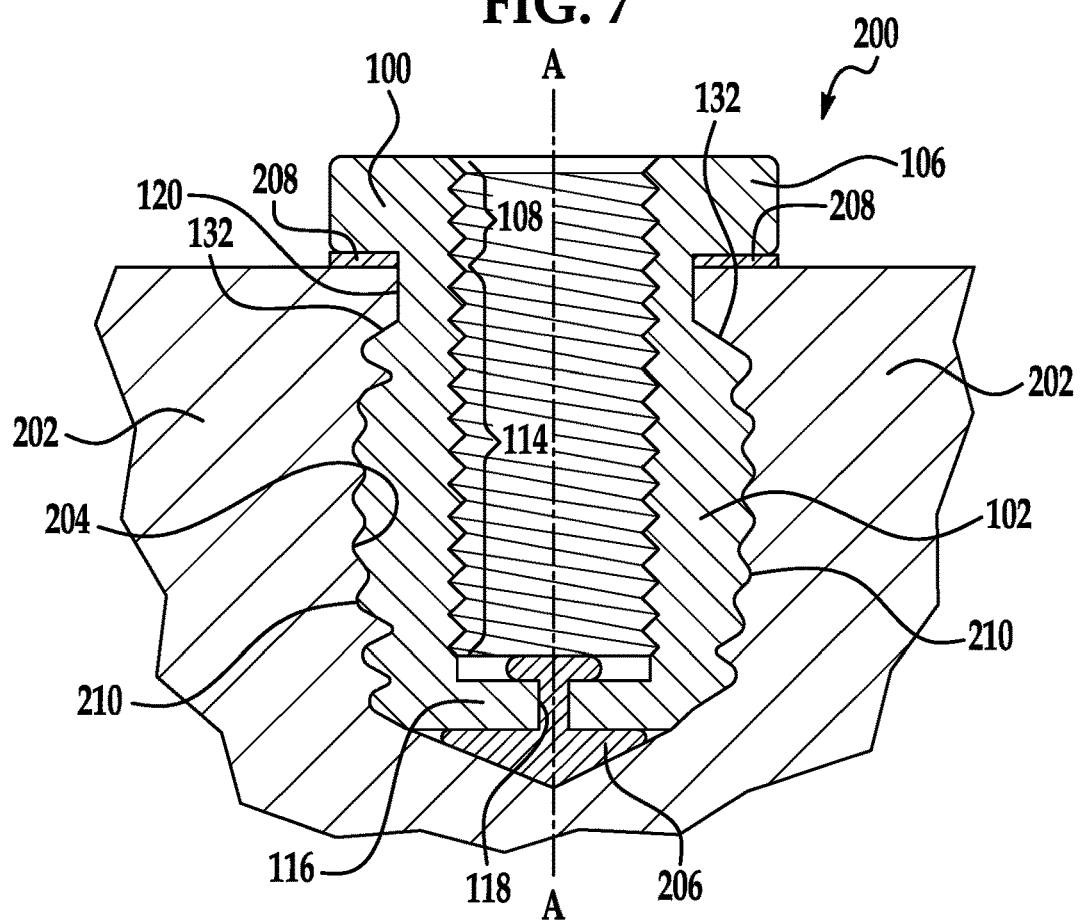
FIG. 8 illustrates the faceted lobular threaded component of FIGS. 1-7 in a blind hole of another object.

As best seen in FIG. 8, the shank 102 may extend from the head 106 and may also include an internally threaded shank bore 114 or passage coaxial with the internally threaded head passage 108, and an end wall 116 extending across the internally threaded shank passage and that may be generally closed except with a vent hole 118 therethrough in communication with the shank internal passage 114. The shank 102 also may include an unthreaded cylindrical portion 120 between a threaded portion of the shank 102 and the head 106.

Figure 7:
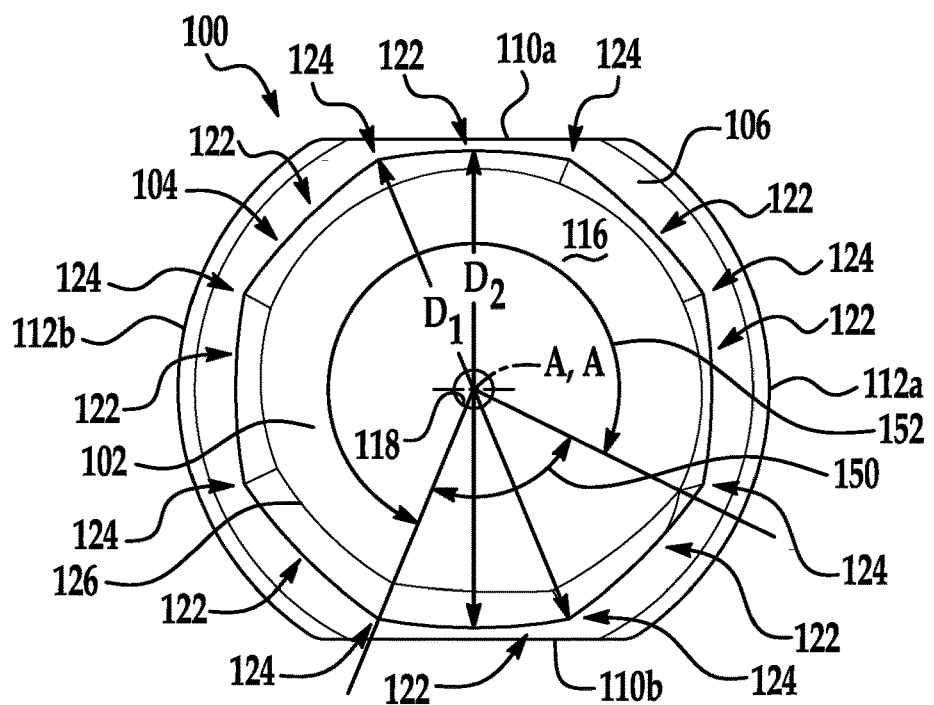
FIG. 7 illustrates an enlarged bottom view of the faceted lobular threaded component of FIGS. 1-6.
Figure 9:
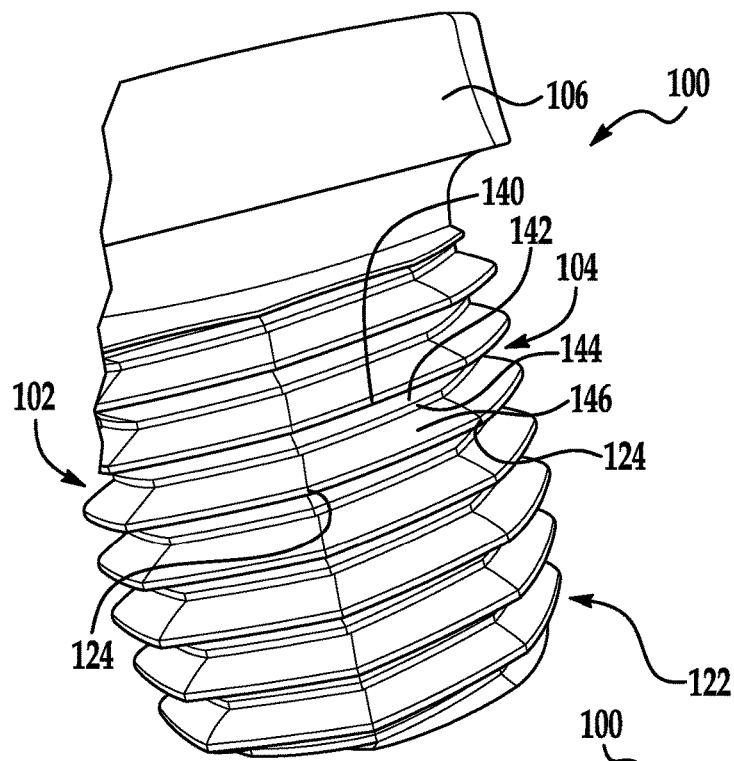
FIG. 9 illustrates an enlarged perspective view of the faceted lobular threaded component of FIGS. 1-7.
Figure 10:
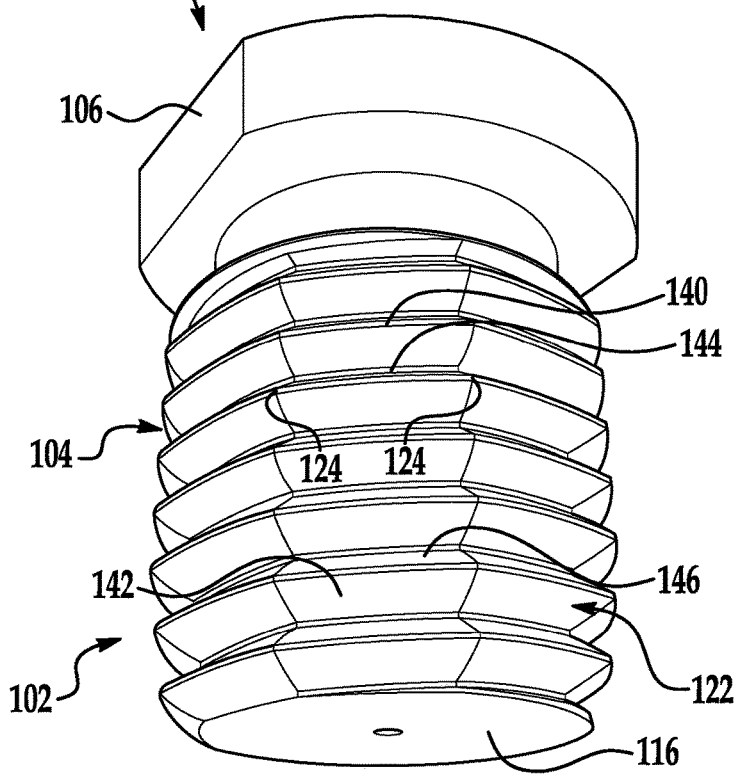
FIG. 10 illustrates another enlarged perspective view of the faceted lobular threaded component of FIGS. 1-7.

As best seen in FIG. 7, the thread 104 includes at least four facets 122 per thread revolution, and at least four lobes 124 per thread revolution circumferentially interspersed between the at least four facets 122 and established by the at least four facets 122. The lobes 124 are on a major diameter $D_1$ of the thread 104, and the facets 124 may be arcuate and on a smaller diameter $D_2$ of the thread 104; smaller than the major diameter $D_1$. In the illustrated embodiments, the thread has eight facets 122 and eight lobes 124. In other embodiments, however, any suitable quantity of facets 122 and lobes 124 may be used, preferably at least four. In the illustrated embodiments, the lobes 122 and the facets 124 are embodied not only at thread tips, but also at thread roots, and on thread flanks of the thread 104. More specifically, as shown in FIGS. 9 and 10, which illustrates the component 100 prior to application of any adhesive, a thread 104 may include a thread tip facet 140, a thread lower/outboard flank facet 142, a thread root facet 144, and a thread upper/inboard flank facet 146. The thread tip facet 140, thread lower flank facet 142, thread root facet 144, and thread upper flank facet 146 may define a distinct facet 122 extending between adjacent lobes 124 of the shank 102. While a single thread 104 is identified in FIGS. 9 and 10 in this manner, it should be noted that each of the threads 104 may be faceted along the thread tips, flanks, and roots. The thread 104 may be characterized as a machine thread, more specifically, a V type thread, UN, UNR thread, and the like.

The shank 102 may include a thread start 126. The thread start 126 may intersect the end wall 116, which may be perpendicular to the longitudinal axis A-A of the shank 102. Intersecting the end wall 116, the thread start 126 may be circular in a first portion 152 (see FIG. 7), which may extend over a range of 135 to 300 degrees about the shank 102 including all ranges, sub-ranges, endpoints, and values in that range. Preferably, the thread start 126 may be circular for at least 180 degrees. The thread start 126 may be faceted in a second portion 150 (see FIG. 7), which may extend over a range of 45 to 135 degrees including all ranges, sub-ranges, endpoints, and values in that range. Preferably, the thread start 126 may be faceted for at least 90 degrees.

Figure 4:
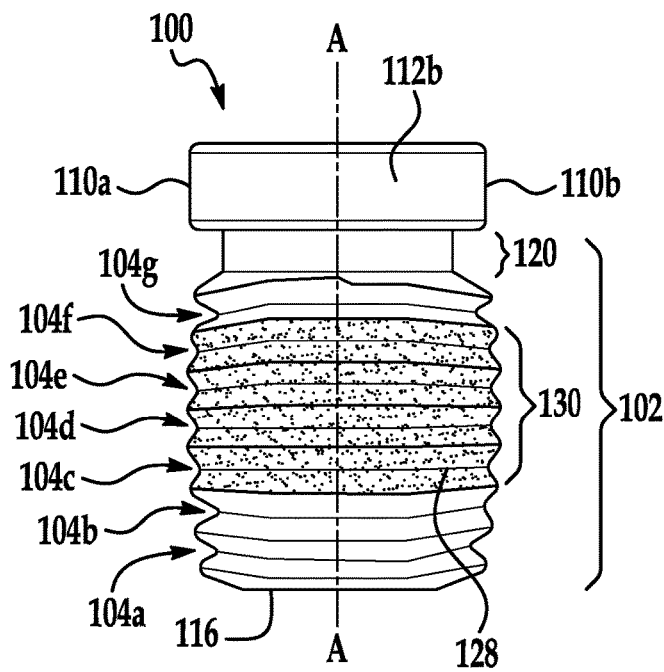
Figure 5:
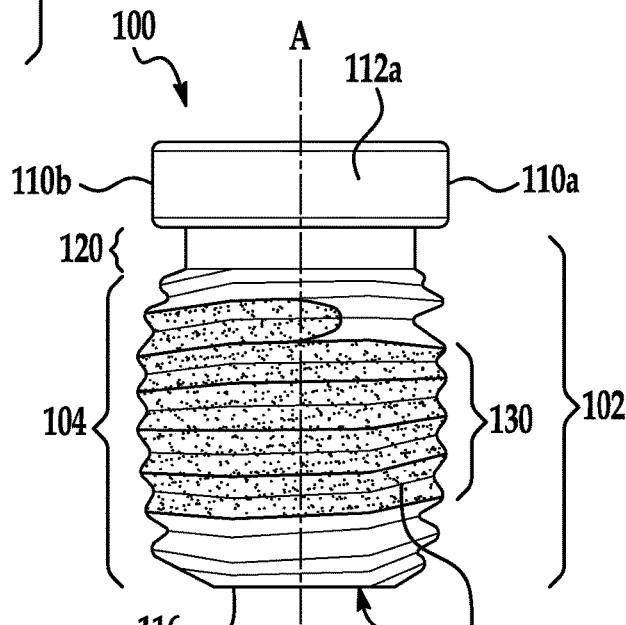
Figure 6:
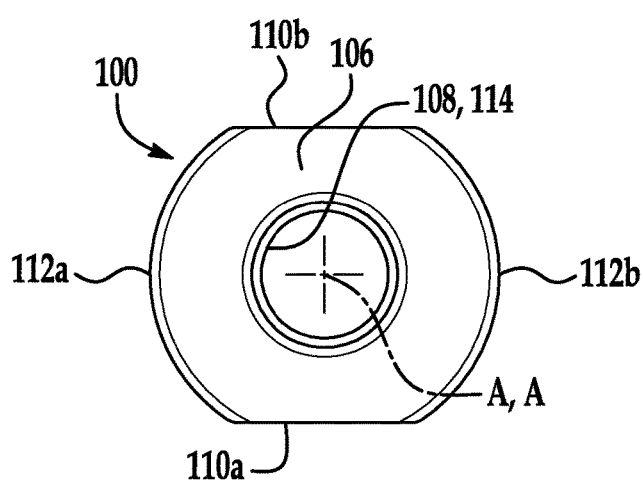
FIG. 6 illustrates a top view of the faceted lobular threaded component of FIGS. 1-5.

Unlike conventional threads, even conventional lobular threads that are characterized by a smoothly continuous helix from one end of the thread to another, the presently disclosed faceted lobular thread 104 is characterized by a series of discretely configured facets 122 arranged around and along the shank 102. The example large component embodiment illustrated has about seven full thread revolutions 104a, 104b, 104c, 104d, 104e, 104f, and 104g (as best seen in FIG. 4), and eight lobes 124 and facets 122 (as best seen in FIG. 7), thereby providing at least fifty-six distinct facets 122 along the thread 104.

The component 100 may carry an adhesive 128, which may be carried by the thread 104, more specifically, by an intermediate section 130 of the threaded portion 104 of the shank, as best seen in FIGS. 2-5. The adhesive 128 may be accommodated by the annular channel 120 located between the head 106 and the thread 104 and configured to receive the adhesive 128 when the component 100 is completely threaded into a corresponding hole (not shown in FIG. 2). The head 106 and the unthreaded cylindrical portion/annular channel 120 may include a protective anti-galvanic coating (not specifically illustrated).

As shown in FIG. 8, an example assembly 200 may include an object 202 having a blind hole 204 that is initially unthreaded, and the above-described component 100 threaded into the blind hole 204, thereby forming a corresponding thread shape in the blind hole 204 of the object 202. The object 202 may include a panel, a frame member, or any other object suitable to receive a threaded component. The object 202 may be composed of a mild steel, aluminum or magnesium or other non-ferrous metal, or of fiberglass material, polymeric material, or any material suitable for being threaded with internal threads. The assembly 200 also may include an adhesive/sealant 206 disposed between a bottom of the blind hole and the end wall 116 of the shank 102, and may be at least partially vented through the vent hole 118 during assembly of the component 100 to the object 202. Also, the assembly 200 may include a barrier gasket between the head 106 and the object 202, as will be described further below.

The thread 104 is deep and coarse for maximum thread mass, and has a lead-in geometry for aggressive engagement and insertion in an unthreaded hole in another object. The head 106 ultimately seats against the object 202. More specifically, as the internal thread 210 is initially formed in the hole 204 of the object 202, material from the object 202 will be displaced rearwardly, creating an annular bulge or puffing up of excess material from the object 202. As the head 106 approaches the object 202, it first contacts the bulge of excess material (not shown in FIG. 8) and then seats against the object 202, thereby packing the excess material over a rearward flank 132 of the faceted lobular thread 104 to lock the component 100 onto the other object 202 to provide significant attachment strength. Accordingly, the excess material is packed flush against the rearward flank 132.

Figure 3:
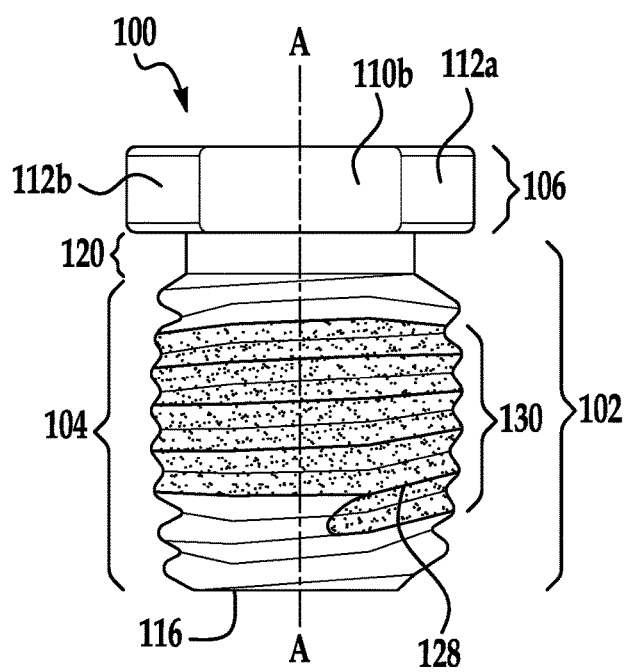

As best seen in FIG. 3, beginning at least one full thread revolution from the end of the component 100, the adhesive 128 is applied. The adhesive 128 may be an epoxy, for instance, a multi-part epoxy, for example, NYLOK PRE-COTE 85. Initially, the adhesive 128 may provide lubrication to the thread generating process as the component 100 is being driven into the other object 202 (not shown in FIG. 3). In any case, the parts of the adhesive 128 mix, flow along the thread 104, and eventually harden to increase pull out resistance. The hardened adhesive 128 may be disposed between the external thread(s) 104 of the component 100 and internal thread(s) 210 formed in the object 202, and between the head 106 and the object 202. Accordingly, the adhesive 128 seals and adheres the component 100 to the other object 202. Additionally, the amount and position of the adhesive 128 can be adjusted so that a visible amount of the adhesive 128 squirts out between the head 106 and the object 202 when the component 100 is completely fastened to the object 202 to provide a visual identifier that the component 100 is completely fastened to the object 202.

Also, a barrier gasket or other tension assurance barrier may be located between the head 106 and the object 202, for example, in the form of a barrier washer 208 carried at the head 106 of the component 100. The barrier washer 208 may prevent galvanic corrosion and may also carry beads, for instance, ceramic beads, that may be used to dig into the object 202 to prevent loosening due to vibration. In addition to, or instead of, the barrier washer 208, a barrier coating (not shown) may be applied to the head, for instance, NYSHIELD coating.

Further, the head 106 and/or the unthreaded portion 120 of the shank 102 adjacent the head 106 may be coated for surface protection. For example, a coating may include a Chemical Agent Resistance Coating (CARC) mil-spec finish.

Moreover, as the component 100 is driven into the blind hole 204 of the object 202, gas trapped between the component 100 and the bottom of the blind hole 204 can vent through the vent hole 118 in the component to permit the component to be driven into the object with a more uniform drive force. Additionally, an adhesive and/or sealant 206 can be disposed between the bottom of the blind hole 204 and the end of the component 100. As the component 100 is driven into the blind hole 204, the adhesive/sealant 206 becomes compressed and vents through the vent hole 118 of the component 100. Thereafter, the adhesive/sealant 206 sets up or hardens such that it will act as a vacuum suction feature to increase pull out resistance. The adhesive/sealant 206 may be a silicone material or any other material suitable to provide the aforementioned functionality.

Ultimately, the component 100 may provide an internally threaded hole 108/114 for use as an attachment point for integration of other structure and attachments. For example, a small mount version of component 100 is configured to be inserted in a 1.0315" diameter unthreaded hole in a panel, and provide a ½"-13 internally threaded hole in passage 108/114. The faceted lobular machine thread 104 creates a corresponding internal thread 210 in the unthreaded hole 204 by displacing metal of the hole 204 to produce the internal thread 210 with uninterrupted grain flow of the material and via work hardening during installation. The grain of the material of the object 202 may become compressed and compacted and may wrap around the threads 104 of the component 100 for strong coupling of the component 100 to the object 202. The formed thread 210 may have a grain direction that follows the shape of the faceted lobular thread 104 of the component 100 in an undulating manner. Accordingly, unlike with tapped holes, here there is little to no clearance between the faceted lobular machine thread 104 and the internal thread 210 formed thereby in the object 202, for excellent thread to thread contact. Also, tapped holes result in cutting across material grain of the object, thereby leaving fracture planes in the cut threads.

During installation, a guide plate (not shown) may be used to assist in maintaining the component 100 square to the object 202 as the component 100 is being threaded into the object 202.

The threaded mount provides resistance to effects of vibration, shock, and thermal cycling and will reduce the likelihood of unscheduled field service repairs.

Unlike a tri-lobular thread, which can be easily roll-formed, the presently disclosed thread does not lend itself to roll-forming. Accordingly, the presently disclosed octo-lobular thread in the example illustrated in FIGS. 1-8 is not produced via roll-forming and, thus, is not a roll-formed thread. Also unlike a tri-lobular thread, the presently disclosed thread is faceted.

Unlike prior art threaded components adapted for insertion into unthreaded or partially threaded holes, the presently disclosed component 100 does not include flutes or a cutting edge and, thus, has a fluteless or uninterrupted thread 104 that is circumferentially continuous with no interruptions.

The present disclosure includes a tolerance range around feature dimensions of plus or minus 20 percent including all ranges, sub-ranges, endpoints, and values in that tolerance range.

The present disclosure includes any and all ratios or proportions between dimensions of any and all features of the disclosed component and object. Likewise, the present disclosure includes a tolerance range around such ratios or proportions of plus or minus fifteen percent including all ranges, sub-ranges, endpoints, and values in that tolerance range.

The presently disclosed method may be carried out, for example, using a manual grinding machine with an eccentric or whirly fixture, with a computer-numerically-controlled (CNC) grinding machine, or the like. Those of ordinary skill in the art will recognize that CNC grinders can be programmed to carry out variations on the presently disclosed method that are effectively equivalent to the presently disclosed method.

Figure 11:
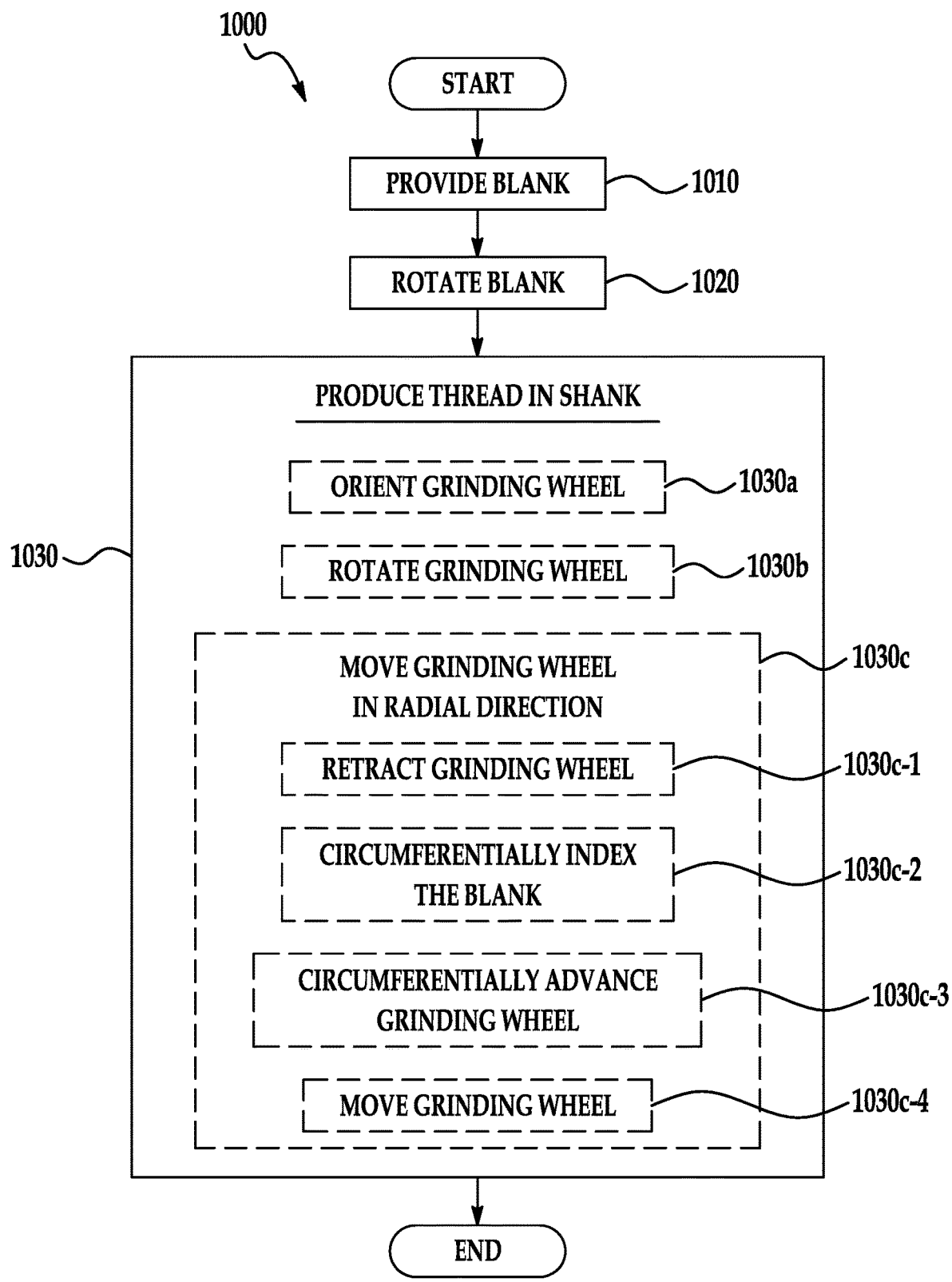
FIG. 11 illustrates a process flow diagram of an example method of making and/or installing a faceted lobular threaded component.

Turning now to FIG. 11, a process flow diagram of an example process 1000 of making and/or installing a faceted lobular threaded component, e.g., component 100, is illustrated. Process 1000 may begin at block 1010, in which a blank is provided that includes a shank extending along a longitudinal axis, having an external surface circumferentially extending around the longitudinal axis, and terminating in a shank end surface. Proceeding to block 1020, the blank may be rotated about the longitudinal axis, coaxial with a blank grinding axis. Process 1000 may then proceed to block 1030.

At block 1030, a circumferentially continuous thread may be produced in the shank around the longitudinal axis of the shank, wherein the thread includes lobes having lobe radii and arcs between the eight lobes having arc radii smaller than the lobe radii.

The thread 104 that is formed in block 1030 may be formed in any manner that is convenient. In one example approach to forming the thread 104 in a shank, block 1030 may include the following sub-steps:

Sub-block 1030a, in which a grinding wheel is oriented with respect to the longitudinal axis A-A of the blank/component 100 at a thread helix angle;

Sub-block 1030b, in which the grinding wheel is rotated about a grinding wheel axis; and Sub-block 1030c, in which the grinding wheel is moved in a radial direction to remove material from the shank, including moving the grinding wheel to a lobe depth of cut to establish lobe dimensions, and moving the grinding wheel to an arc depth of cut to establish arc dimensions.

Moreover, sub-block 1030c may, in one example approach, include the following sub-steps:

Sub-step 1030c-1: retracting the grinding wheel from the arc depth of cut;

Sub-step 1030c-2: circumferentially indexing the blank 1/x of 360 angular degrees about the longitudinal axis of the shank (with x being equal to the quantity of lobes of the component being formed);

Sub-step 1030c-3: longitudinally advancing the grinding wheel 1/x of a pitch of the thread; and then Sub-step 1030c-4: moving the grinding wheel to the arc depth of cut to establish subsequent arc dimensions.

Sub-block 1030c may further include grinding while rotating the blank about the longitudinal axis, and grinding while rotating the blank about an axis parallel to but offset from the longitudinal axis.

Sub-block 1030c further may include using a grinding wheel dressed with a single tooth to grind the thread to the lobe depth of cut, and offsetting the longitudinal axis of the blank from a centerline of a chuck holding the blank, swinging the chuck about the chuck centerline over 1/x of 360 angular degrees, using the same grinding wheel to grind the thread to the arc depth of cut, retracting the grinding wheel away from the blank, circumferentially indexing the blank 1/x of 360 angular degrees about the longitudinal axis of the shank, and longitudinally indexing the grinding wheel with respect to the blank 1/x of a pitch of the thread (where x again represents the number of lobes/facets being formed in the component). Process 1000 may then terminate.

Figure 12:
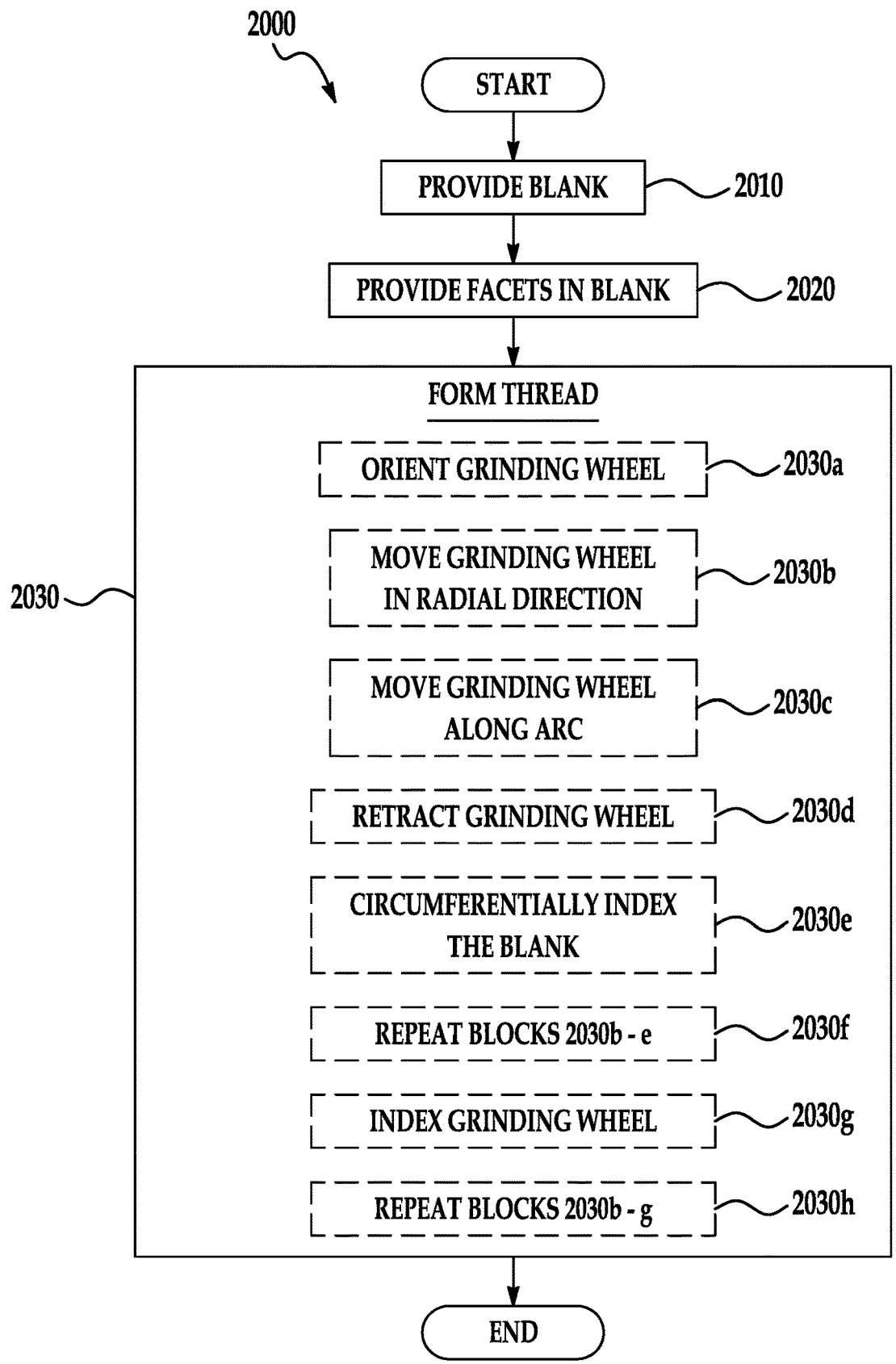
FIG. 12 illustrates a process flow diagram of another example method of making and/or installing a faceted lobular threaded component.

Turning now to FIG. 12, a process flow diagram of another example process 2000 of making and/or installing a faceted octo-lobular threaded component, e.g., component 100, is illustrated. Process 2000 may begin at block 2010, where a blank is provided having a shank extending along a longitudinal axis and terminating at a shank end. Proceeding to block 2020, a plurality of facets may be produced, circumferentially adjacent to one another, around the shank of the bolt. In one example, at least four facets are produced. In another example, eight facets are produced. Process 2000 may then proceed to block 2030.

At block 2030, a circumferentially continuous thread may be produced around the longitudinal axis on the eight facets, e.g., thread 104. The thread may be formed in any manner convenient. In one example approach to forming the thread 104, block 2030 includes:

Sub-block 2030*a*: orienting a grinding wheel with respect to the longitudinal axis at a thread helix angle;

Sub-block 2030*b*: moving the grinding wheel in a radial direction with respect to the longitudinal axis into a first facet of the eight facets, starting proximate the shank end;

Sub-block 2030*c*: moving the grinding wheel circumferentially −22.5 to 22.5 angular degrees along an arc;

Sub-block 2030*d*: retracting the grinding wheel;

Sub-block 2030*e*: circumferentially indexing the blank to expose another facet of the eight facets to the grinding wheel;

Sub-block 2030*f*: repeating steps 2030*b* through 2030*e* until all eight facets have been ground;

Sub-block 2030*g*: indexing the grinding wheel with respect to the blank; and Sub-block 2030*h*: repeating steps 2030*b* through 2030*g* until the thread is complete. Process 2000 may then terminate.

In other embodiments, those of ordinary skill in the art will recognize from the present disclosure that the faceted lobular threaded component 100 may be produced using an end mill (although that method may be more time-consuming), or possibly using a specially designed hob, or any other type of mill that can be adapted to produce the faceted lobular thread disclosed herein, or using electro-discharged machining, 3D printing, or any other techniques adaptable to produce the faceted lobular thread disclosed herein.

The example illustrations of a component 100 and methods of making/installing the same, such as processes 1000 and 2000, generally provide an improved thread forming insert having a very high pull out strength for use in materials such as aluminum, magnesium and mild steel materials, merely as examples. By contrast, previous approaches involving standard tapping of holes into relatively softer materials, for example aluminum, tend to leave a relatively weak thread strength that can be stripped out more easily. Accordingly, the thread forging lobular faceted threaded component 100 described herein offers a much higher resistance to fastener pull out forces.

Example thread forming components such as component 100 may provide a larger thread engagement diameter to the panel to which the component is installed, resulting in greater thread engagement. Additionally, example methods of installing a thread-forming component generally may create forged threads, which work-harden the threads, thereby creating greater strength compared with threads that are tapped or cut. The forged threads may also compress the aluminum material grain in the panel, creating greater strength in comparison to cut threads, which may cut across materials grains in the material, leaving the panel subject to fracture along the material grain. The increased number of lobes creates a higher number of thread crests, providing greater attachment than other fasteners having fewer crests about a perimeter of the fastener. Generally, the greater the number of thread crests that are engaged with the material in the panel, the greater the degree of "bite" into the panel material, and thus the greater the resistance to pull out.

Upon installation, the lobular faceted threaded component may provide a female threaded hole for use as an attachment point for bolting other objects onto the panel. The other objects(s) can be bolted to the at full published clamp load strength, and without any forces being applied to the component engagement with the panel. The forged threads of the lobular faceted threaded component also offer greater resistance to pull out which might otherwise occur as a result of dynamic forces from extreme thermal cycling, extreme vibration and shock loads, such as those associated with ballistic events.

Previous approaches employing an external thread that is a continuous helix spiral at a prescribed thread pitch, or formed in a rolling process or other typical bolt threading method suffer from relatively lower pull-out thresholds, in comparison to the example component 100 described herein. For example, the threads 104 on the exterior of the component 100 may be created by grinding the thread shape profile across each of the individual flat facets of a blank with a very slight arc. The thread pitch may be created by grinding the above mentioned thread shape profile on a slight angle, and thus once all of the facets are ground around the circumference of the component 100, a prescribed thread pitch has been created (e.g., 13 threads per inch, or any other thread pitch that is convenient). The ground segments may be continued all the way along the entire length of the insert. Further, the component 100 may have a comparatively abbreviated lead in to the first full "thread," thereby providing a relatively stronger starting thread that will dig into the object 200 (such as an aluminum panel, merely as one example) aggressively to assure immediate thread forging engagement without strip-out of the threads formed in the object 200. Additionally, the external threads created by the component 100 in the object 200 may be to a fastener standard pitch/size, even though the insert's thread design is not typical. Accordingly, if removal of the component 100 is ever necessary, a standard bolt may be installed as an alternative (e.g., if another similar component 100 is not available). In one example of the component 100, the facets are smaller (e.g., by at least 0.080 inches) than the crests where each of the segments meet. Thus, rotation of the component 100 into the object 200 pushes the material of the object 200 (e.g., aluminum) into the thread shape in an undulating manner relatively slowly, thereby creating stronger work hardening of the material of the object 200 and lowering the drive forces associated with turning the component 100 the component 100 is run down into the object 200. As noted above, at least four facets/lobes may be provided by the component 100. In some cases, it has been found that having eight lobes/facets further improves thread starting characteristics of the component 100, and generally promotes alignment of the component 100 (e.g., by keeping the component 100 square to the start hole in the object 200). Additionally, providing increased numbers of facets/lobes (e.g., eight) generally provides increased insert pull out resistance compared with fewer facets/lobes.

The hole in the center of the component 100 may be used to bolt brackets, structural supports and other components to the object 200, as noted above. If the object 200 was simply tapped to the fastener size, by comparison, a bolt threaded directly into the object would relatively easily pull the threads out with minimal force, particularly where the object 200 is formed of a relatively softer material such as aluminum. By comparison, the component 100 pull-out force may exceed the bolt's ultimate strength, and as such the point of failure, if one should occur, would be in the bolt shank (e.g., the bolt will stretch and fail over its published yield strength before the component 100 will pull out of the object 200). In one example approach, the depth of the tapped hole in the component 100 is two and a half (2.5) times the diameter of the internally facing threads of the tapped hole in the component 100. Additionally, the length of the full external lobed thread 104 of the component 100 may also be equal to or longer than two and a half times the diameter of the bolt eventually threaded into the internally facing threaded hole in the component 100. Pull-out resistance of the component 100 can be further increased by increasing the full lobed thread length of the component (i.e., more formed threads engaged in the object 200). Alternatively, a larger body diameter of the component (i.e., the outside diameter of the component 100) can increase the engagement surface area of the threads 104, as well. This upsizing will also increase pull-out resistance of the component 100.

The faceted lobular threaded component 100 will perform very well without the application of any additional thread locking glues. Nevertheless, an adhesive such as adhesive 128 may be provided, and the retention strength of component 100 may be further increased by the application of a thread locking adhesive when installing into the object 200. The adhesive 128 can initially (i.e., after applied to the component 100, and prior to installation of the component 100 to object 200) be "dry" to the touch, and may be a commonly available two-part epoxy that is placed on the threads 104. Alternatively, the component 100 may be shipped as plain (i.e., without the adhesive 128) and a commercially available liquid thread locking adhesive can be manually applied at the time/location of installation of the component 100 to the object 200.

As also discussed above, when installing example components 100 into blind holes, another method of increasing pullout resistance is to place an amount of glue, e.g., a silicone glue, into the bottom of the predrilled insert installation hole in the object. As the component 100 is tightened down, the trapped air in the bottom of the pre-drilled hole is forced out through the vent hole in the bottom wall 116 of the component 100. As the component 100 approaches the bottom of the installation hole, the air is substantially expelled, and the glue may completely fill the void. Further tightening will completely seat the component 100, and extrude the silicone glue through the insert vent hole, thereby vacuum-sealing the component 100 into the object 200, and further increasing pull-out resistance of the component 100.

An additional enhancement to retention may be realized when the component 100 is tightened completely down to the outside panel surface of the object 200. As the component 100 is threaded into the object 200, the first thread 104 entering the material of the object will displace the material of the panel surface upward, visibly "puffing up" the perimeter of the hole in the object 200). As the component 100 is threaded into the pre-drilled hole of the object 200 further, the head 106 of the component 100 comes into contact with the object, and the puffed-up perimeter material is crushed down over the shoulder 132 of the last thread of the component 100. This crushed panel material may serve to lock the component 100 into the object 200, adding significantly to pull-out resistance.

Example components 100 may be used against aluminum and magnesium panels, and as such there may be galvanic corrosion concerns at the interface between the component 100 and the object where the component 100 is formed of steel. To prevent reaction and the degradation of the connection of the component 100 to the object 200, a common barrier film washer may be installed on the component 100 to insulate the interface area. Alternatively, a commercially applied, dry-to-the-touch, spray-on barrier film may be applied to the component 100 before shipment to a customer or end user. Sealing the component 100 to the object 200 after installation with paint or a spray sealant, merely as examples, can also help resist corrosion.

While example components 100 may be formed in a computer or CNC forming process, a component 100 may also be formed manually, e.g., in a thread-whirling process. For example, a blank may be mounted into a sleeve having a number of sides corresponding to a desired number of facets (e.g., an eight-sided sleeve to form eight facets about the perimeter of the completed component 100). The blank may be locked into the index/whirly tool, and then a first lobe root may be ground into the blank. Subsequently, the part holder sleeve may be unlocked and the sleeve rotated to the next flat, and the grinding process repeated for the next facet after the blank is secured. Each lobe may thus be ground individually. Where eight lobes/facets are desired, the 360-degree part is divided by eight, resulting in a 45-degree rotation between each lobe in between grinding steps. The part grind may begin at the "zero" point in the fixture, with the index/whirly having adjustable hard stops to prevent grinding past each lobes maximum angular extent (e.g., for eight lobes/facets, a 45-degree maximum). Continuing with the example eight lobe/facet component 100, the first stops may be are set at minus-22.5 degrees and plus-22.5 degrees. A grinding wheel may be dressed for a single thread tooth, which is lowered as the fixture part is swung back and forth on its 45-degree arc segment, and the grinding wheel begins to cut metal of the blank. The grinding wheel will begin to make contact with the part at the zero index/whirly (i.e., the center of the arc). As the grinding wheel is lowered to the prescribed root depth (low point between lobe crests), the tooth cut gradually spans the full 45 degree segment.

In the example of the manually formed component 100, the thread pitch may be created by placing the index/whirly on a slight angle to the grinding wheel. For example, where a 1-3/8-6" pitch is desired, an index/whirly angle of 2 degrees 23 minutes for each segment, multiplied by the desired number of lobes (e.g., eight) will generate the correct thread pitch for the component 100, in one example. Accordingly, eight (or the appropriate number corresponding to the desired number of lobes/facets) arc shaped lobes with a defined rise (crest) and fall (root) between lobes (e.g., of 0.080 inches) and a pitch of 2 degrees 23 minutes. To align the next tooth to the area of the blank ground immediately prior, the grinding wheel may be positioned forward 1/x of the part thread pitch (where "x" corresponds to the desired number of lobes/facets).

A ratio between (1) a diameter of the component 100 over the crest and (2) a diameter of the component 100 over the root of the lobes may be varied, and may be dependent upon the thread size. In one example configuration of the component 100, a relatively smaller size component has a 0.040 inch to 0.060 inch change in diameter (including all ranges, sub-ranges, endpoints, and values in that range) from a lobe crest to a root/facet. In another example configuration of the component 100, a relatively larger size component 100 may have a 0.060 inch to 0.120 inch change in diameter (including all ranges, sub-ranges, endpoints, and values in that range) from a lobe crest to a root/facet. Any other change or transition in diameter may be employed that is convenient.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A faceted lobular threaded component, comprising:
   a head;
   a shank extending along a longitudinal axis away from the head; and
   an external faceted lobular thread in the shank extending around the longitudinal axis;
   wherein the external faceted lobular thread includes:
      at least four facets per thread revolution, and
      at least four lobes per thread revolution circumferentially interspersed between the at least four facets and established by the at least four facets,
   wherein the head has an internally threaded head passage, and wherein the shank extends from the head and includes:
      an internally threaded shank passage coaxial with the internally threaded head passage; and
      an end wall extending across the internally threaded shank passage with a vent hole therethrough in communication with the shank internal passage.

2. The component of claim 1, wherein the shank has no flutes interrupting the thread such that the thread is circumferentially continuous with no interruptions.

3. The component of claim 2, wherein the thread extends circumferentially continuously from an end wall of the shank to an annular channel of the shank, the annular channel located adjacent the head.

4. The component of claim 1, wherein the thread has eight facets and eight lobes.

5. The component of claim 1, wherein external flats of the head include two flat opposite sides and wherein the head includes two semi-cylindrical opposite sides circumferentially interspersed between the two flat opposite sides.

6. The component of claim 1, further comprising an adhesive carried by the thread.

7. The component of claim 1, further comprising an annular channel located between the head and the thread and configured to receive the adhesive when the component is completely threaded into a corresponding hole.

8. The component of claim 1, further comprising a protective coating on the head.

9. The component of claim 1, wherein the external faceted lobular thread includes eight facets per thread revolution.

10. The component of claim 1, wherein the lobes each define a major diameter of the thread in the shank, and the facets each define a minor diameter of the thread in the shank, the minor diameter being smaller than the major diameter.

11. A faceted lobular threaded component, comprising:
   a head; and
   a shank extending from the head and including:
      a generally closed end having a vent hole;
      an internal threaded bore extending through the head to proximate the closed end and in communication with the vent hole;
      an external faceted lobular threaded portion defining an external thread, the external faceted lobular threaded portion defining at least four facets per thread revolution;
      an external unthreaded cylindrical portion between the threaded portion and the head;
      an anti-galvanic coating on the head and the external unthreaded cylindrical portion; and
      an adhesive coating covering an intermediate section of the threaded portion.

12. The component of claim 11, wherein the shank has no flutes interrupting the external thread such that the thread is circumferentially continuous with no interruptions, and wherein the external thread extends circumferentially continuously from the closed end of the shank to the external unthreaded cylindrical portion.

13. The component of claim 12, wherein the external faceted lobular threaded portion includes eight facets per thread revolution.

14. A faceted lobular threaded component, comprising:
   a head;
   a shank extending along a longitudinal axis away from the head; and
   an external faceted lobular thread in the shank extending around the longitudinal axis;
   wherein the external faceted lobular thread includes:
      at least four facets per thread revolution, wherein at least one facet of the at least four facets includes a thread tip facet and at least one thread flank facet, and
      at least four lobes per thread revolution circumferentially interspersed between the at least four facets and established by the at least four facets.

15. The component of claim 14, wherein the at least one thread flank facet includes a lower flank facet and an upper flank facet on either side of the thread tip facet.

16. The component of claim 14, wherein the at least one facet includes a thread root facet.

17. The component of claim 16, wherein the at least one thread flank facet is axially aligned with the thread tip facet and the thread root facet.

18. The component of claim 14, wherein the shank includes a thread start which is circular-shaped in a first portion and faceted in a second portion.

19. The component of claim 18, wherein the first portion is at least 180° around the shank and the second portion extends over a range of 45-135°, inclusive, around the shank.

20. The component of claim 14, wherein the head has an internally threaded head passage, and wherein the shank extends from the head and includes:
- an internally threaded shank passage coaxial with the internally threaded head passage; and
- an end wall extending across the internally threaded shank passage with a vent hole therethrough in communication with the shank internal passage.

21. An assembly, comprising:
- an object having an unthreaded blind hole; and
- a faceted lobular threaded component threaded into the blind hole, comprising:
  - a head,
  - a shank extending along a longitudinal axis away from the head, and
  - an external faceted lobular thread in the shank extending around the longitudinal axis and including:
    - at least four facets per thread revolution, and
    - at least four lobes per thread revolution circumferentially interspersed between the at least four facets and established by the at least four facets,
  - an internal passage,
  - a closed end, and
  - a vent hole through the closed end.

22. The assembly of claim 21, further comprising:
- a material between a bottom of the blind hole and the closed end of the faceted lobular threaded component and vented through the vent hole.

23. The assembly of claim 22, wherein the material is an adhesive and/or a sealant.

24. The assembly of claim 23, wherein the material is a silicone material.

\* \* \* \* \*